United States Patent
Chia et al.

(10) Patent No.: US 7,835,595 B2
(45) Date of Patent: Nov. 16, 2010

(54) IMAGE PROCESSING SYSTEM AND METHOD FOR IMAGE SCALING

(75) Inventors: Hui-Fen Chia, Changhua County (TW); Ying-Yuan Tang, Taipei County (TW)

(73) Assignee: Princton Technology Corporation, Taipei County (TW)

( * ) Notice: Subject to any disclaimer, the term of this patent is extended or adjusted under 35 U.S.C. 154(b) by 977 days.

(21) Appl. No.: 11/652,534

(22) Filed: Jan. 12, 2007

(65) Prior Publication Data

US 2008/0050044 A1    Feb. 28, 2008

(30) Foreign Application Priority Data

Aug. 23, 2006    (TW) .............. 95130955 A

(51) Int. Cl.
G06K 9/32    (2006.01)
G09G 5/00    (2006.01)

(52) U.S. Cl. ............... 382/299; 382/298; 345/3.3; 345/3.4

(58) Field of Classification Search .......... 382/299, 382/300, 298; 358/1.2; 345/3.3, 3.4
See application file for complete search history.

(56) References Cited

U.S. PATENT DOCUMENTS 6,259,427 B1    7/2001    Martin et al.
7,062,077 B1 *  6/2006    Kelley ............ 382/128
2004/0052432 A1 * 3/2004    Lee et al. ............ 382/298
2005/0210087 A1 * 9/2005    Wang et al. ............ 708/200
2006/0078227 A1 * 4/2006    Chang et al. ............ 382/298

FOREIGN PATENT DOCUMENTS

TW    244027    11/2005

* cited by examiner

Primary Examiner—Vu Le
Assistant Examiner—Soo Jin Park
(74) Attorney, Agent, or Firm—Muncy, Geissler, Olds & Lowe, PLLC

(57) ABSTRACT

An image processing method for scaling an image from an original resolution to a target resolution is provided. A pixel value $P_T$ of a target pixel point $N_T$ in the target resolution is theoretically composed of original pixel values $P_1$-$P_K$ of original pixel points $N_1$-$N_K$ in the original resolution, wherein K is a positive integer larger than 1. First, theoretical combination ratios $R_1$-$R_K$ corresponding to the original pixel points $N_1$-$N_K$ are found. Then, the theoretical combination ratios $R_1$-$R_K$ are converted to corresponding weights $W_1$-$W_K$, wherein each of the corresponding weights $W_1$-$W_K$ is an integer between 1 and $2^n$, n is an integer, and the sum of the corresponding weights $W_1$-$W_K$ is $2^n$. The original pixel values $P_1$-$P_K$ are calculated with the corresponding weights $W_1$-$W_K$ using a scaler, to generate the pixel value $P_T$ of the target pixel point $N_T$ and complete the image processing.

14 Claims, 9 Drawing Sheets

| C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|
| U1= 31 | U2= 63 | U3= 94 | U4= 125 | U5= 156 | U6= 188 | U7= 219 | U8= 250 | U9= 281 | U10= 313 | U11= 344 | U12= 375 | U13= 406 | U14= 438 | U15= 469 | U16= 500 |

FIG. 3

| C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|
| U1= 18 | U2= 37 | U3= 55 | U4= 74 | U5= 92 | U6= 111 | U7= 129 | U8= 148 | U9= 166 | U10= 185 | U11= 203 | U12= 222 | U13= 240 | U14= 258 | U15= 277 | U16= 300 |

IMAGE PROCESSING SYSTEM AND METHOD FOR IMAGE SCALING

BACKGROUND OF THE INVENTION

1. Field of the Invention

The invention relates to image processing, and in particular, to an image processing system and method for scaling or resolution of an image.

2. Description of the Related Art

Image and display systems often require image resolution to be scaled up or down to meet various requirements. Images (pixels) resolution may be scaled upward from low resolution to high resolution. Images may also be scaled down when the original resolution is higher than the desired display resolution. When an original image is displayed in a different resolution to form a new image, the changed resolution causes the pixel value of each pixel point in a newly formed image to be formed by more pixel values of original pixel points in the original image with specific theoretical combination ratios applied thereto.

For example, if a pixel value of pixel point $N_{A'}$ in the new image is formed by two pixel values of original pixel points $N_A$ and $N_B$ respectively in the original image, the pixel value of pixel point $N_{A'}$ may be theoretically the summation of ⅔ the pixel value for pixel point $N_A$ and ⅓ the pixel value for pixel point $N_B$ or of half the pixel value summation of both pixel points $N_A$ and $N_B$.

A common technique used to scale image resolution is linear interpolation. The linear interpolation utilizes pixel value of each pixel point needed for the new pixel point and its related theoretical combination ratio to generate the new pixel value of a pixel point in the new image resolution. As shown in FIG. 1, for example, if an image resolution is to be down-scaled from an original resolution with 500 points to a target resolution with 300 points by 1D (one dimension) interpolation, new pixel values $P_{A'}$, $P_{B'}$ and $P_{C'}$ of pixel points $N_{A'}$, $N_{B'}$ and $N_{C'}$ respectively in the target resolution can be determined according to pixel values $P_A$, $P_B$, $P_C$, $P_D$ and $P_E$ of pixel points $N_A$, $N_B$, $N_C$, $N_D$ and $N_E$ respectively in the original resolution using following formulae:

$$P_{A'} = \frac{300 \times P_A + 200 \times P_B}{500}, \quad (1)$$

$$P_{B'} = \frac{100 \times P_B + 300 \times P_C + 100 \times P_D}{500}, \quad (2)$$

$$P_{C'} = \frac{200 \times P_D + 300 \times P_E}{500}, \quad (3)$$

where the numbers 300 and 200 in formula (1) indicate theoretical combination ratios $R_A$ and $R_B$ for pixel values $P_A$ and $P_B$ forming the pixel value $P_{A'}$, respectively. In addition, it can be observed from formula (1) to (3) that each theoretical combination ratio for the pixel value of pixel point $N_{A'}$, $N_{B'}$, $N_{C'}$, $N_{D'}$, or $N_E$ depends on the resolution used. In this example, each theoretical combination ratio is not exceeding 300 (i.e. the target resolution) and each denominator in the formula is 500 (i.e. the original resolution).

Scaling an image up or down directly by linear interpolation requires several multiplication and division operations, thus requiring hardware design with sufficient bit number of multipliers and dividers to perform the necessary operations. Typically, as the bit number of multiplier or divider increases, hardware cost and complexity increase accordingly. In this example, if the image is scaled from a resolution with 500 points to another resolution with 300 points, at least nine bits of multiplier/divider in the hardware are required to complete the operations.

Once the image is enlarged or becomes a two- or more dimension image, the bit number of multiplier/divider needed for hardware is also increased relatively. Accordingly, hardware costs and the time for operation increase.

Thus, a method and system for scaling image resolution with reduced hardware cost and operating time are desired.

BRIEF SUMMARY OF THE INVENTION

An exemplary embodiment of a system for scaling an image from an original resolution to a target resolution is provided, wherein a pixel value $P_T$ of a target pixel point $N_T$ in the target resolution is theoretically composed of original pixel values $P_1$-$P_K$ of original pixel points $N_1$-$N_K$ in the original resolution, and K is a positive integer larger than 1. The system comprises a microcontroller, a memory, a table index generator and a scaler. The microcontroller generates a look-up table according to the original resolution, wherein the look-up table provides a conversion rule from a value to an integer not larger than $2^n$, and n is an integer. The memory provides the original pixel values $P_1$-$P_K$. The table index generator obtains from the look-up table corresponding weights $W_1$-$W_K$ according to theoretical combination ratios $R_1$-$R_K$ corresponding to the original pixel points $N_1$-$N_K$, wherein each of the corresponding weights $W_1$-$W_K$ is an integer between 1 and $2^n$. The scaler generates the pixel value $P_T$ of the target pixel point $N_T$ according to the original pixel values $P_1$-$P_K$ and the corresponding weights $W_1$-$W_K$. The microcontroller generates the theoretical combination ratios $R_1$-$R_K$.

The invention also provides an image processing method for scaling an image from an original resolution to a target resolution, wherein a pixel value $P_T$ of a target pixel point $N_T$ in the target resolution is theoretically composed of original pixel values $P_1$-$P_K$ of original pixel points $N_1$-$N_K$ in the original resolution, and K is a positive integer larger than 1. First, theoretical combination ratios $R_1$-$R_K$ corresponding to the original pixel points $N_1$-$N_K$ are found. Then, the theoretical combination ratios $R_1$-$R_K$ are converted to corresponding weights $W_1$-$W_K$, wherein each of the corresponding weights $W_1$-$W_K$ is an integer between 1 and $2^n$, n is an integer, and the sum of the corresponding weights $W_1$-$W_K$ is $2^n$. The original pixel values $P_1$-$P_K$ are calculated with the corresponding weights $W_1$-$W_K$ by using the scaler to generate the pixel value $P_T$ of the target pixel point $N_T$ and complete the image processing.

BRIEF DESCRIPTION OF THE DRAWINGS

The invention can be more fully understood by reading the subsequent detailed description and examples with reference to the accompanying drawings, wherein:

FIG. 3 shows an embodiment of a look-up table T according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a method and system to convert the theoretical combination ratios $R_1$-$R_K$ corresponding to original pixel points $N_1$-$N_K$ originally used by linear interpolation to smaller values using a digital processor or a microcontroller such that the aforementioned operations can be completed by a smaller bit number of multiplier/dividers. According to the invention, if the bit number of multiplier is an integer n, the combination ratios will be changed from a value, such as several hundreds, to a small integer between 1 and $2^n$ by checking a table, such that the factors of the multiplication/division operations performed to the combination ratios are reduced from a large range to a small range. Reduced bit number of multipliers and no requirement for a divider reduce hardware cost and simplify related operations.

Figure 1:
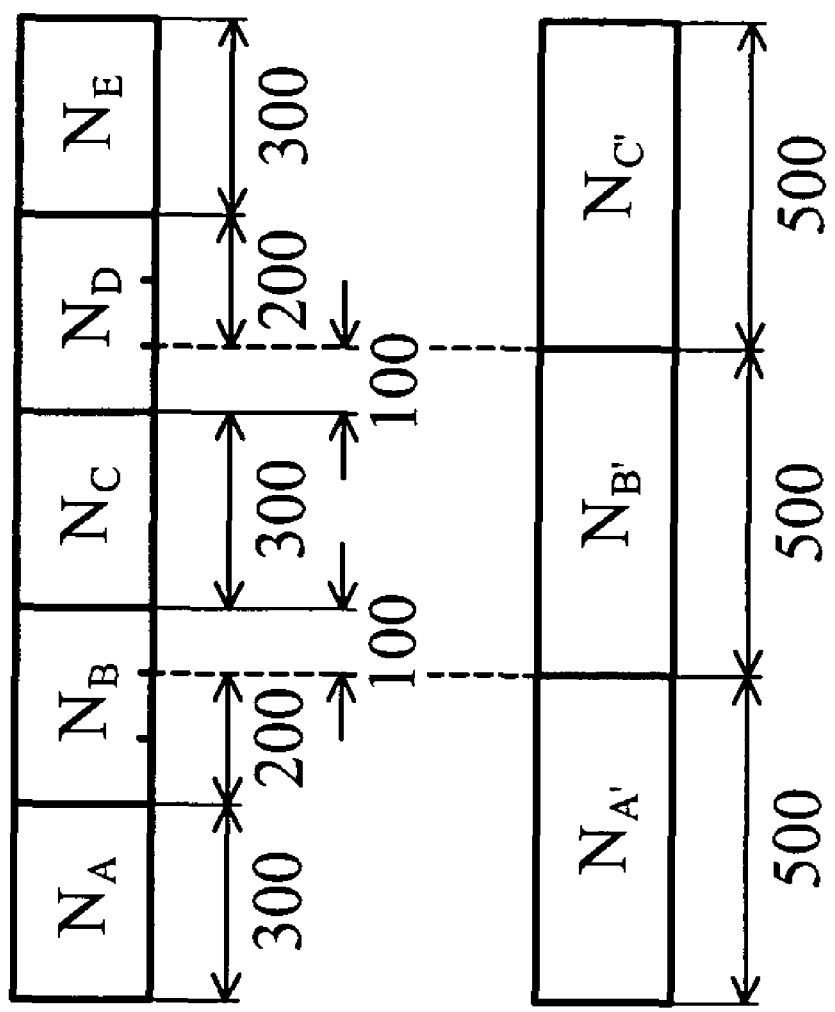
FIG. 1 is a schematic illustration of a conventional method for down-scaling image resolution.
Figure 2:
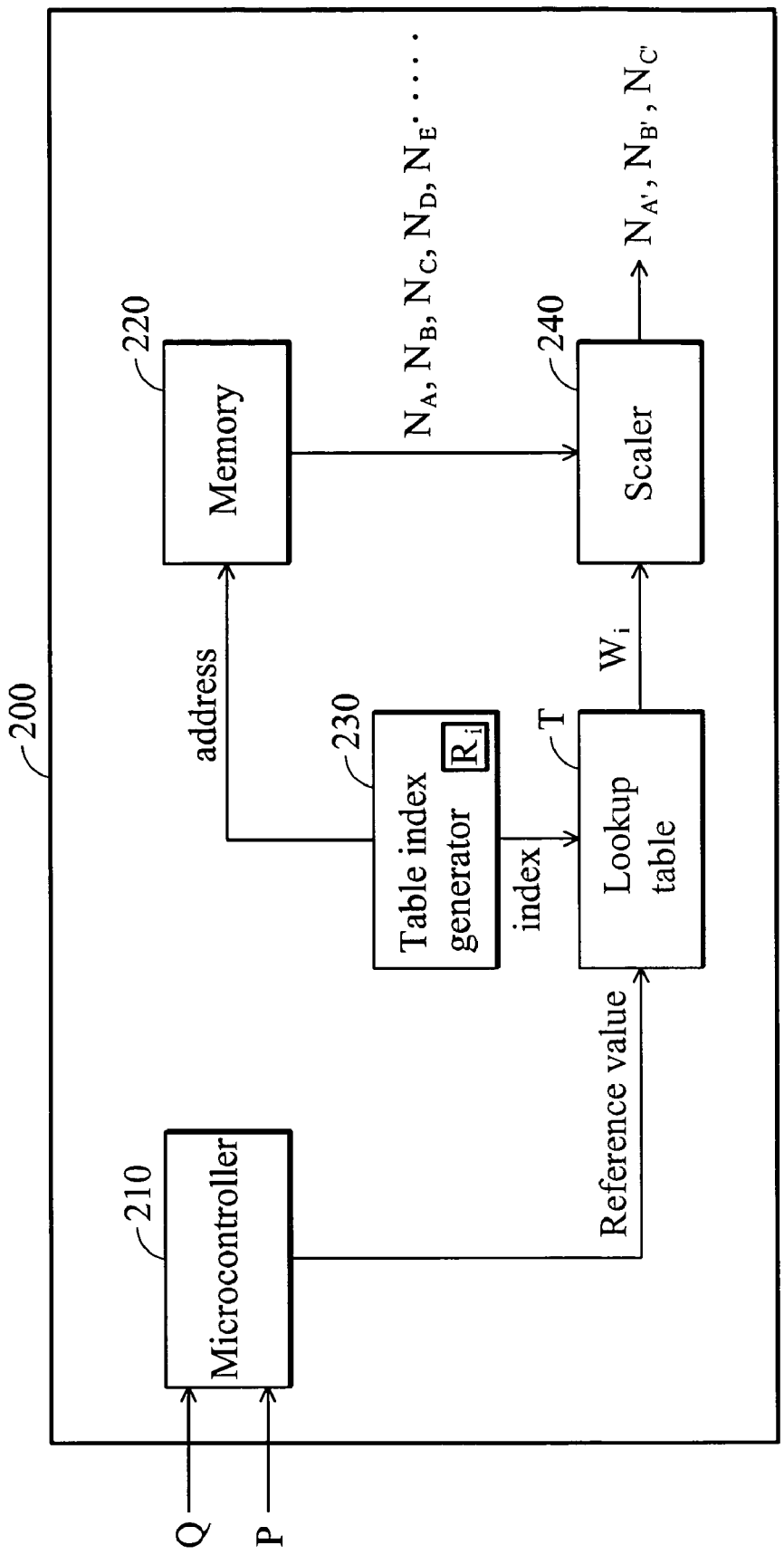
FIG. 2 shows an embodiment of a scaling system according to the invention.

FIG. 2 shows an embodiment of a scaling system according to the invention. Scaling system 200 comprises a microcontroller 210, a memory 220, a table index generator 230 and a scaler 240. The memory 220 stores original pixel values $P_1$-$P_K$ of all original pixel points $N_1$-$N_K$ in original resolution and may send the pixel values $P_1$-$P_K$ to the scaler 240 for further operation, wherein K is an integer larger than 1. A look-up table T generated by the microcontroller 210 is stored in a storage device (not shown).

The look-up table T provides a conversion rule from a reference value to an integer not larger than $2^n$. To do this, for example, the look-up table T is divided into several table fields, in which a table field CX represents the $X^{th}$ table field on the table T, and X represents its related field order. For example, the table field C1 represents the $1^{st}$ table field on the table T and its related field order is set to one, the table field C2 represents the $2^{nd}$ table field on the table T and its related field order is set to two and so on. In other words, the value of a specific field order X can be derived from the table field CX on the table T. In addition, each table field CX on the table T has a reference value UX, and bigger field order X gets bigger reference value. For example, if the table fields C1 and C2 have reference values U1 and U2 respectively, the reference value U2 should be bigger than the reference value U1 due to the related field order of table field C2 is bigger than that of table field C1. The range for the field order X of the table field CX depends on bit number n of multiplier utilized while the range for the reference value UX depends on original resolution.

The table index generator 230 generates table indices based on table T for looking up and finding a table field on table T according to a specific theoretical combination ratio $R_K$. The table index generator 230 also stores memory addresses of the pixel values $P_1$-$P_K$ so as to obtain a specific pixel value $P_K$ from the memory 220. The related field order of the found table field is set to a corresponding weight $W_K$ corresponding to the specific theoretical combination ratio $R_K$. The scaler 240 comprises at least one n bit number of multiplier (not shown), performing the multiplication operations to generate the pixel value $P_T$ of the target pixel point $N_T$ in new resolution (target resolution) after scaling. The scaler 240 generates new pixel value $P_T$ of the target pixel point $N_T$ in new resolution to scale the image according to the original pixel values $P_1$-$P_K$ and corresponding weights $W_1$-$W_K$ corresponding to original pixel points $N_1$-$N_K$ that form the target pixel point $N_T$. Using the scaling system 200 of the invention, scaling between different image resolutions can be achieved so as to further drive a display (not shown) to display the scaled image and complete the image processing.

An original resolution Q before image scaling and a new resolution P to be scaled are provided to the scaling system 200. Microcontroller 210 receives the original resolution Q and generates a look-up table which has a number of table fields, each having a related reference value.

FIG. 3 shows an embodiment of a look-up table T according to the invention. In this embodiment, it is assumed that original resolution Q is 500 and new resolution P is 300. Thus, reference value of each table field on the look-up table T is generated according to original resolution Q. The first table field C1 has a field order 1 and a reference value U1, 31. The second table field C2 has a field order 2 and a reference value U2, 63 and so on.

As shown in FIG. 3, in this embodiment, the bit number n of multiplier is 4, so that look-up table T is divided into 16 ($2^n$) table fields C1~C16 according to the bit number n in which each table field has a related reference value. It should be noted that the reference values within the table fields on the look-up table T are 16 positive integers arranged from smallest to largest according to original resolution Q. As an example, in this embodiment, original resolution Q is roughly divided into 16 equal parts and all reference values of the table fields are arranged from smallest to largest in which each reference value can be obtained by accumulating a specific value. For instance, as shown in FIG. 3, if the original resolution Q is 500, the reference value U9 of table field C9 is 281, so reference value U10 of table field C10 can be obtained by following formula:

$$U10 = U9 + Q/16 = 281 + 500/16 \approx 313.$$

Moreover, reference value U16 of largest table field C16 is set to the maximum possible value, 500 (i.e. original resolution Q) and reference value U1 of the smallest table field C1 is set to the minimum possible value. These reference values are used as a range when checking the look-up table T.

Figure 4:
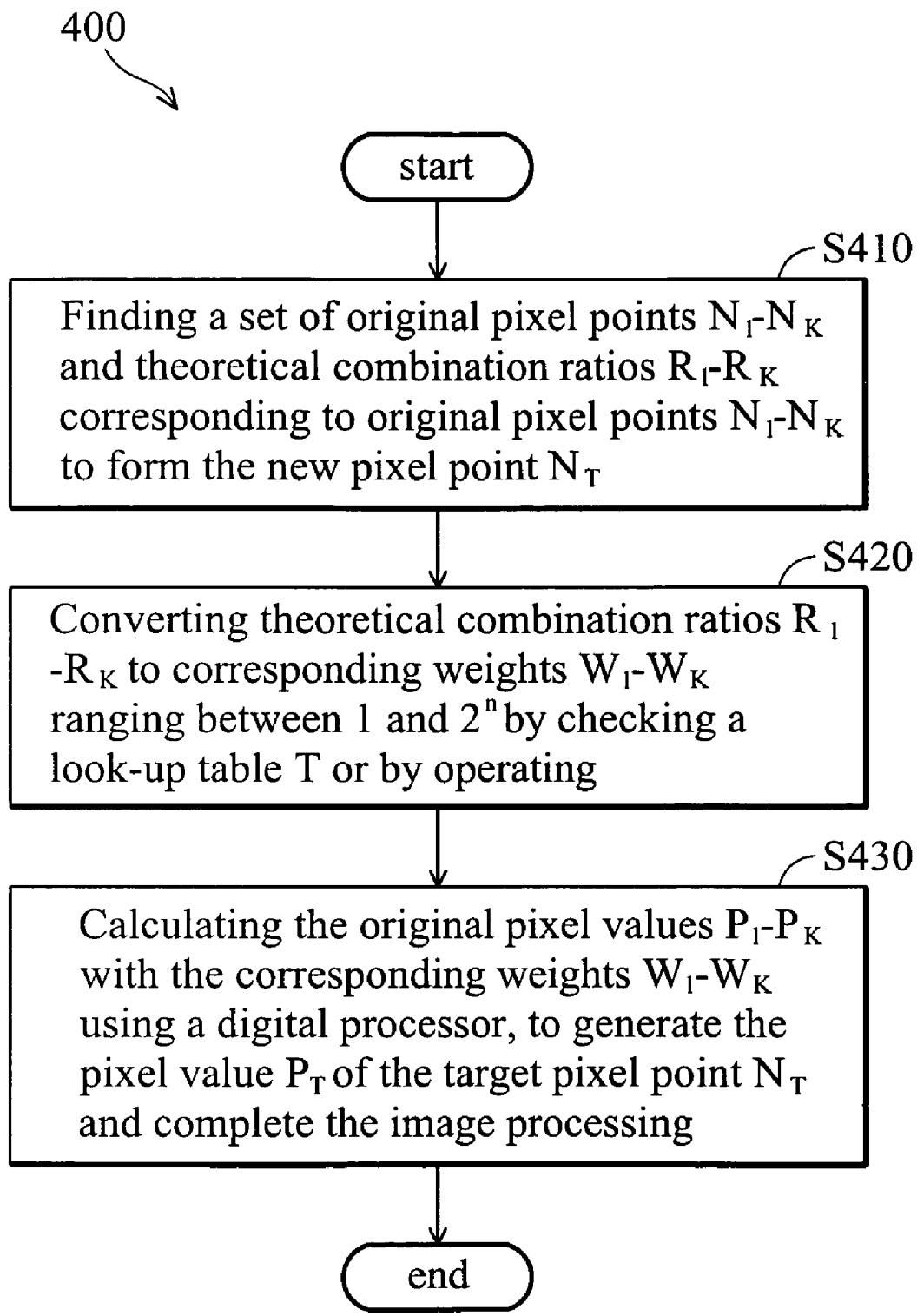
FIG. 4 is a flowchart of an image processing method according to an embodiment of the invention.

FIG. 4 is a flowchart of an image processing method according to an embodiment of the invention, used to generate a pixel value $P_T$ of a target pixel point $N_T$ according to one or more pixel values of original pixel points $N_1$-$N_K$. When applied in all original pixel points, the image can be scaled up or down. In this embodiment, it is assumed that the bit number n of multiplier is 4. First, in step S410, a set of original pixel points $N_1$-$N_K$ and theoretical combination ratios $R_1$-$R_K$ corresponding to original pixel points $N_1$-$N_K$ to form the new pixel point $N_T$ are found. In this embodiment, the linear interpolation is used to obtain the set of original pixel points and the corresponding theoretical combination ratios $R_1$-$R_K$ for scaling operation. The theoretical combination ratios depend on original resolution and target resolution. As shown in formulae (1)-(3), all of the theoretical combination ratios $R_1$-$R_K$ can be obtained in advance using simple calculation and derivation, and thus the details are omitted here for brevity. Accordingly, in step S420, theoretical combination ratios $R_1$-$R_K$ are converted to corresponding weights $W_1$-$W_K$ ranging between 1 and $2^n$ by checking a look-up table T or by operating. As shown in FIG. 3, look-up table T has been divided into 16 table fields in which each has a related reference value according to original resolution Q. Each theoretical combination ratio $R_K$ corresponding to the original pixel point $N_K$ is compared to the reference values to obtain an integer between 1 and $2^n$ corresponding to the theoretical combination ratio $R_K$ by finding a reference value within a table field corresponding most closely thereto. The field order of the table field corresponding most closely to the reference value is set to the weight $W_K$ for the theoretical combination ratio $R_K$.

For example, as shown in FIG. 3, if the theoretical combination ratio $R_K$ to be compared is 300, since reference value U9 of table field C9 is 281 and reference value U10 of table field C10 is 313, and 300 is between 281 and 313, the closest reference value for theoretical combination ratio $R_K$ (300) is 313 (reference value U10 of table field C10); therefore the weight $W_K$ corresponding to the theoretical combination ratio $R_K$ is set to the field order of table field C10, 10. Thus, according to the invention, a larger theoretical combination ratio 300 is converted to a smaller value 10. In step S430, each of the pixel values $P_1$-$P_K$ of the original pixel points $P_1$-$P_K$ in the set and corresponding weights $W_1$-$W_K$ obtained from step S420 are calculated to generate pixel value $P_T$ of the target pixel point $N_T$.

It should be noted that, in this embodiment, reference values within the table fields are arranged from smallest to largest, thus comparing and finding a reference value closest to the theoretical combination ratio $R_K$ entails finding the smallest reference value that exceeds or equals the theoretical combination ratio $R_K$ and field order of the table field related to the smallest reference value is the weight $W_K$ corresponding to the theoretical combination ratio $R_K$. Nevertheless, the comparison for theoretical combination ratios $R_1$-$R_K$ to find the corresponding weights $W_1$-$W_K$ therefore may be obtained by other manners in some embodiments, such as by half-adjust rounding or rounding off method. For example, the corresponding weight $W_K$ is determined to be the field order of a first table field or the field order of a second table field using a half-adjust rounding or a rounding off method when the theoretical combination ratio $R_K$ is between a first reference value within the first table field and a second reference value within the second first table field.

In addition, if a target pixel value $P_T$ of a target pixel point $N_T$ in target resolution is theoretically composed of original pixel values $P_1$-$P_K$ of original pixel points $N_1$-$N_K$ in original resolution and k is an integer larger than 1, the corresponding weight $W_K$ can be obtained, without checking the look-up table, by the following in order to hold the sum of the corresponding weights $W_1$-$W_K$ to be $2^n$:

$$W_K = 2^n - \sum_{i=1}^{K-1} W_i$$

where the $W_i$ represents the corresponding weights $W_1$-$W_{K-1}$ obtained by checking the look-up table.

Figure 5:
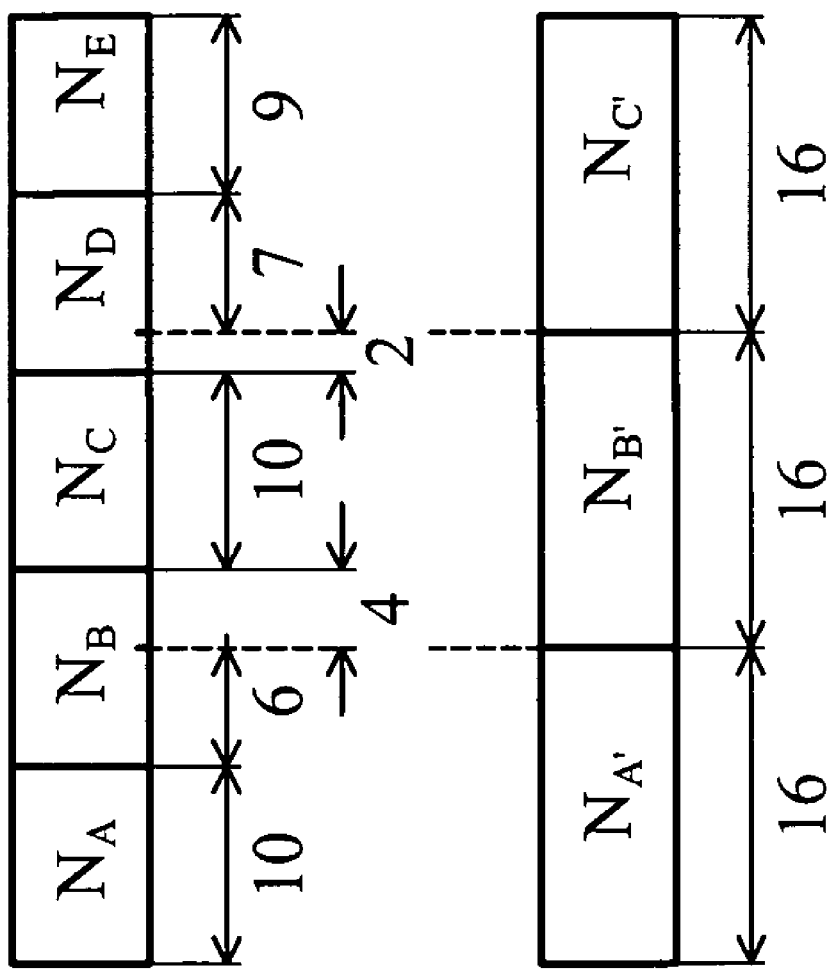
FIG. 5 shows a an image scaling method applied in a one dimensional (1D) image according to an embodiment of the invention.

For example, FIG. 5 shows an image in an original resolution Q which has 500 points scaled down to a new resolution P which has 300 points. In this example, bit number n of multiplier is 4 and linear interpolation is used for scaling operations. As shown in formula (1), a pixel value $P_{A'}$ of a target pixel point $N_{A'}$ is theoretically composed of original pixel values $P_A$ and $P_B$ of original pixel points $N_A$ and $N_B$ with theoretical combination ratios 300 and 200 respectively. In other words, the pixel set for target pixel point $N_{A'}$ is ($N_A$,$N_B$) and the theoretical combination ratios $R_A$ and $R_B$ corresponding to the original pixel points $N_A$ and $N_B$ are 300 and 200 respectively. The same look-up table T having 16 table fields as described in FIG. 3 is generated according to original resolution Q. Accordingly, the look-up table T is checked to find a corresponding weight $W_A$ for theoretical combination ratio $R_A$. Since the theoretical combination ratio $R_A$ is between reference value U9 and U10, it is obtained that the corresponding weight $W_A$ is 10 due to the field order for the reference value U10 is 10. Thus, the weight $W_B$ corresponding to the theoretical combination ratio $R_B$ can be derived by:

$W_B = 16 - W_A = 16 - 10 = 6$

Formula (1) can be represented by formula (4) as:

$$P_{A'} = \frac{10 \times P_A + 6 \times P_B}{16} \quad (4)$$

As shown in formula (4), pixel value $P_{A'}$ of pixel point $N_{A'}$ can be determined using a 4 bit multiplier (i.e. bit number of multiplier is 4) and the division by 16 can be replaced by shifting right the result of ($10 \times P_A + 6 \times P_B$) by four bits. Therefore, the pixel value $P_{A'}$ of pixel point $N_{A'}$ can be obtained without having a divider in the hardware.

Similarly, the pixel value $P_{B'}$ of pixel point $N_{B'}$ can be determined according to the remaining part of pixel value $P_B$ (i.e. 100) of original pixel point $N_B$ and pixel value $P_C$ of original pixel point $N_C$. Formula (2) shows that:

$$P_{B'} = \frac{100 \times P_B + 300 \times P_C + 100 \times P_D}{500}. \quad (2)$$

By checking the look-up table T, since 100 is between U3 (94) and U4 (125), the weight $W_B$ corresponding to the pixel point $N_B$ is found to be 4. In the same way, the weight $W_C$ corresponding to the pixel point $N_C$ is found to be 10 which is the same as weight $W_A$. Therefore, the weight $W_D$ corresponding to the pixel point $N_D$ can be determined by following formula:

$W_D = 16 - W_B - W_C = 16 - 4 - 10 = 2$

Formula (2) can be represented by formula (5) as:

$$P_{B'} = \frac{4 \times P_B + 10 \times P_C + 2 \times P_D}{16}, \quad (5)$$

where $P_D$ is the pixel value of pixel point $N_D$. As shown in formula (5), pixel value $P_{B'}$ of pixel point $N_{B'}$ can also be determined using a 4 bit multiplier as previously discussed. Using the previously discussed operation, the formula (3) can be represented by formula (6) as:

$$P_{C'} = \frac{7 \times P_D + 9 \times P_E}{16} \quad (6)$$

Again, pixel value $P_{C'}$ of pixel point $N_{C'}$ can also be determined using a 4 bit multiplier as previously discussed. It should be noted that when a target pixel value $P_T$ of a target pixel point $N_T$ is theoretically composed of pixel values $P_1$-$P_K$ of original pixel points $N_1$-$N_K$, the operations will be simplified by ignoring theoretical combination ratios less than a predetermined value. The theoretical combination ratio $R_K$ corresponding to a pixel point $N_K$ indicates a ratio for pixel value $P_K$ of the pixel point $N_K$ to form the target pixel value $P_T$ of the target pixel point $N_T$, so the theoretical combination ratio $R_K$ can be ignored or its related weight set to zero if the theoretical combination ratio $R_K$ is less than a predetermined value. In this case, the pixel point next to the pixel point $N_K$ related to the ignored theoretical combination ratio $R_K$ is used to find the corresponding weight $W_K$ by checking the look-up table for simplification of the operations. According to the scaling method of the invention, a theoretical combination ratio $R_K$ corresponding to an original pixel point $N_K$ is first compared to a predetermined value before it is checked in the look-up table. When the theoretical combination ratio $R_K$ is less than the predetermined value, the theoretical combination ratio $R_K$ can be ignored or its related weight $W_K$ set to zero. This theoretical combination ratio $R_K$ can be added into theoretical combination ratio corresponding to the original pixel point next to the original pixel point $N_K$ for checking in the table.

For example, it is assumed that the predetermined value is 16 and the pixel value $P_{D'}$ of target pixel point $N_{D'}$ can be determined by:

$$P_{D'} = \frac{10 \times P_B + 300 \times P_C + 190 \times P_D}{500} \quad (7)$$

In this example, when checking the table, the theoretical combination ratio corresponding to the pixel point $N_B$ is only 10 which is less than the predetermined value 16. Thus, the theoretical combination ratio 10 for pixel point $N_B$ is ignored and added into the theoretical combination ratio corresponding to next pixel point $N_C$ (300) so that the new theoretical combination ratio corresponding to pixel point $N_C$ becomes 310. Then, this theoretical combination ratio 310 corresponding to pixel point $N_C$ is used to check the table. By doing so, the formula (7) can be represented as:

$$P_{D'} = \frac{10 \times P_C + 6 \times P_D}{16}. \quad (8)$$

In sum, if a pixel value $P_T$ of a target pixel point $N_T$ in a target resolution P is theoretically composed of original pixel values $P_1$-$P_K$ of original pixel points $N_1$-$N_K$ in an original resolution Q with related theoretical combination ratios $R_1$-$R_K$ respectively, the pixel value $P_T$ of the target pixel point $N_T$ can be obtained from:

$$P_T = \frac{\sum_{i=1}^{K} P_i \times R_i}{Q}, \quad (9)$$

Where $R_i$ is an integer between 1 and P. Using the method of the invention, the formula (9) can be converted to:

$$P_T = \frac{\sum_{i=1}^{K} P_i \times W_i}{2^n}, \quad (10)$$

wherein each of the corresponding weights $W_1$-$W_K$ is an integer between 1 and $2^n$ and the sum of the corresponding weights $W_1$-$W_K$ is $2^n$.

The invention provides a method using only n bit of multiplier to reduce the bit number of multiplier and remove the divider for operation such that hardware cost and complexity are significantly reduced. In addition, the value of bit number n can be adjusted properly to gain a better performance for the related operations. These benefits will be better observed especially when the image to be scaled is a two- or more dimensional image.

Figure 6A:
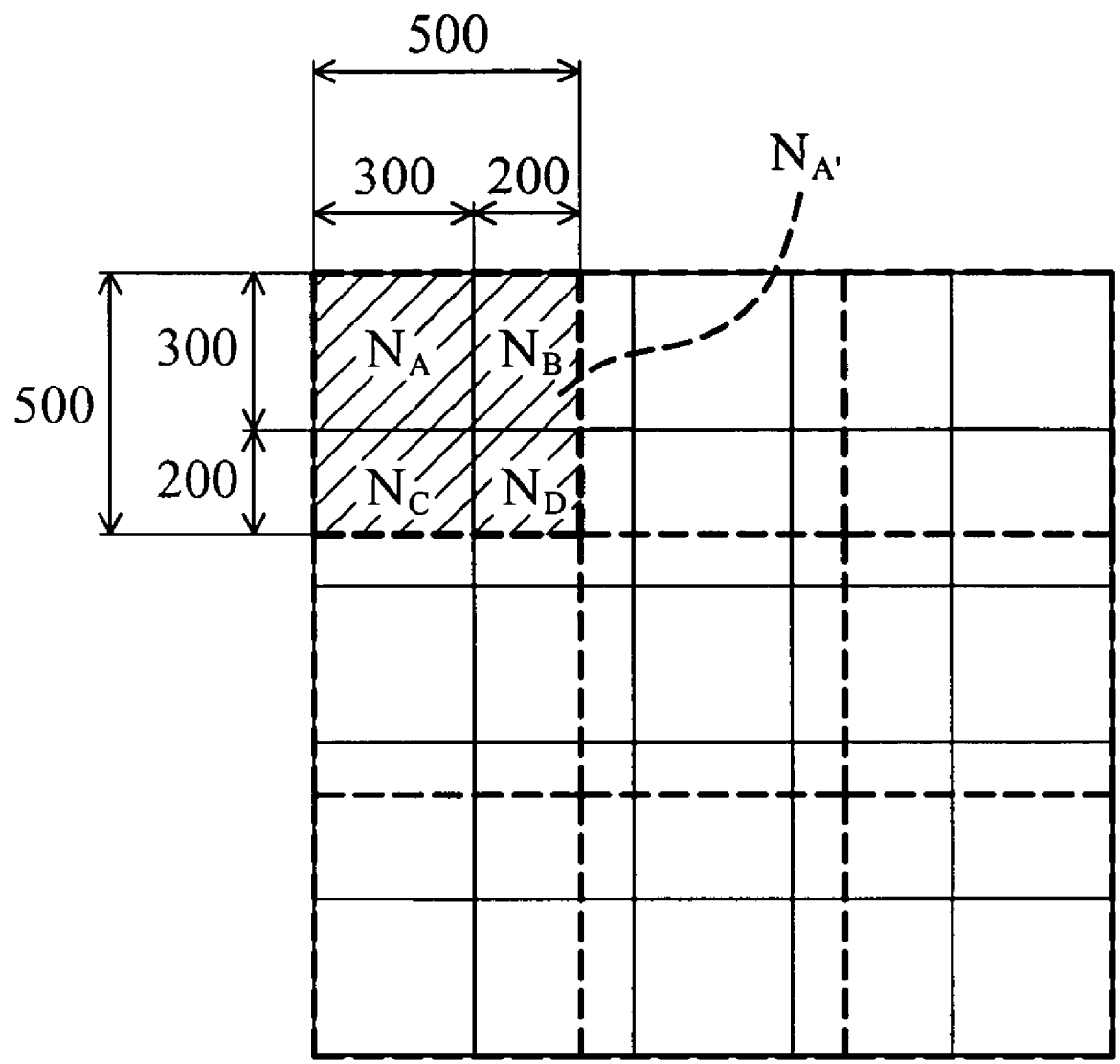
FIG. 6A shows a conventional image scaling method applied in a two dimensional (2D) image.

FIG. 6A shows a relationship between original pixel points in an original resolution Q which has 500×500 points and new pixel points in a new resolution P which has 300×300 points when an image is scaled down from the original resolution Q to the new resolution P. As shown in FIG. 6A, the real line and dotted line area respectively represent the relationship for each pixel point in a 500×500 resolution and in a 300×300 resolution. In this example, a new pixel value $P_{A'}$ of pixel point $N_{A'}$ is formed by pixel values $P_A$, $P_B$, $P_C$ and $P_D$ of original pixel points $N_A$, $N_B$, $N_C$ and $N_D$ respectively. If a conventional bi-linear interpolation for 2-D (two dimensions) is used, the pixel value $P_{A'}$ of new pixel point $N_{A'}$ can be determined by:

$$P_{A'} = \frac{\left( \begin{array}{c} P_A \times 300 \times 300 + P_B \times 200 \times 300 + \\ P_C \times 300 \times 200 + P_D \times 200 \times 200 \end{array} \right)}{500 \times 500} \quad (11)$$

The operations in formula (11), require at least two 9 bits of multipliers/dividers in the hardware. Moreover, these operations are time consuming.

Figure 6B:
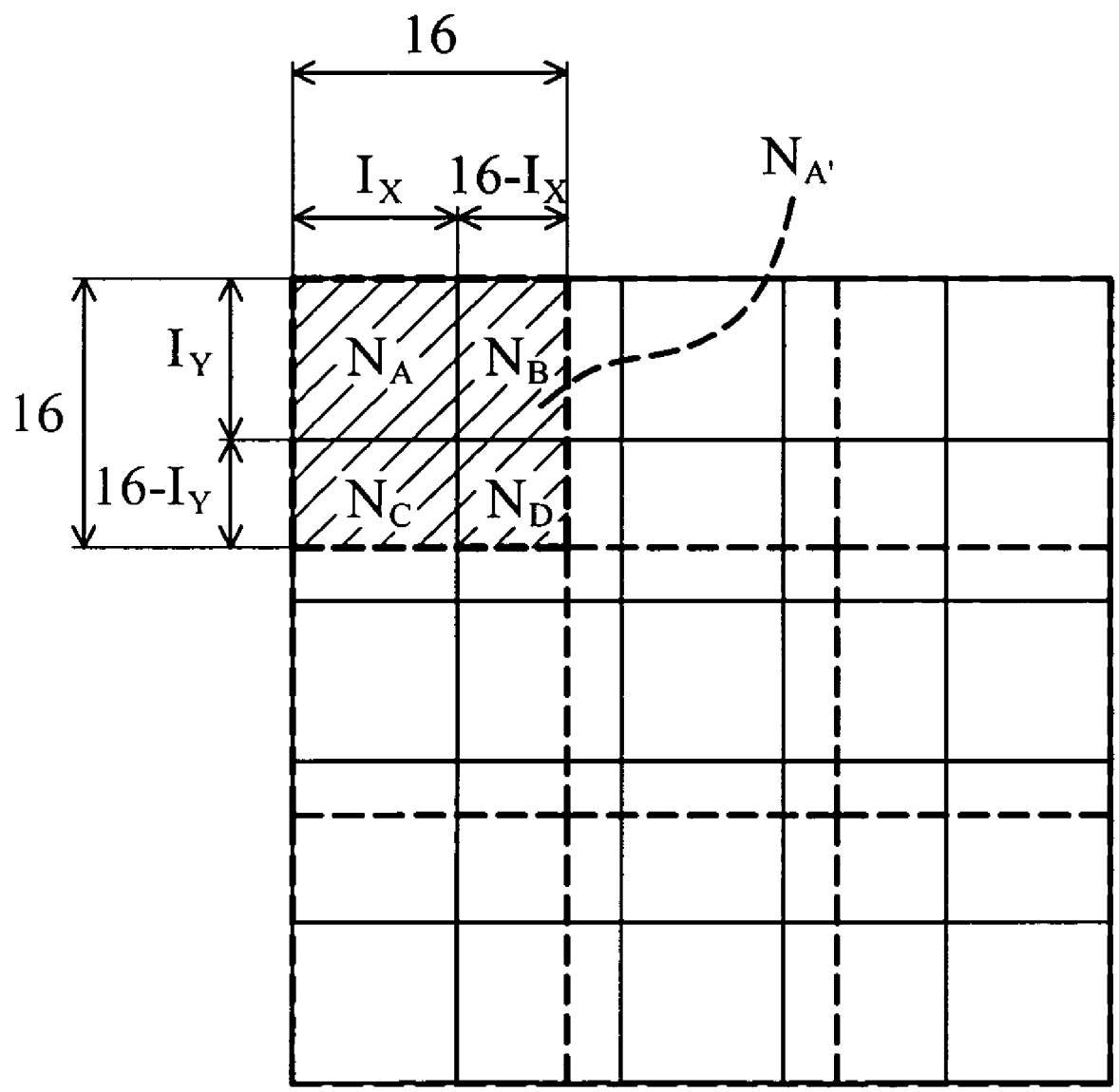
FIG. 6B shows an image scaling method applied in a two dimensional image according to an embodiment of the invention.

FIG. 6B shows an image processing method according to an embodiment of the invention, showing a relationship between original pixel points in an original resolution Q which has 500×500 points and new pixel points in a new resolution P which has 300×300 points when an image is scaled down from the original resolution Q to the new resolution P. As shown in FIG. 6B, the real line and dotted line area respectively represent the relationship for each pixel point in a 500×500 resolution and in a 300×300 resolution.

In this example, if a 4 bit of multiplier is used, the factor for operation is to be $2^n$, that is, 16. For a two-dimensional image, each pixel point has horizontal and vertical coordinates. Therefore, a weight corresponding to such pixel point comprises a horizontal weight related to the horizontal coordinate and a vertical weight related to the vertical coordinate. To find the weights corresponding to theoretical combination ratios corresponding to the pixel points in a two-dimensional image, one look-up table for the horizontal coordinate and one look-up table for vertical coordinate are utilized, from which the corresponding weights can be found. For example, the weight $W_A$ corresponding to the theoretical combination ratio $R_A$ corresponding to pixel point $N_A$ can be represented as $I_X \times I_Y$ using the look-up tables, wherein $I_X$ represents the horizontal weight and $I_Y$ represents the vertical weight corresponding to the theoretical combination ratio $R_A$ and both are integers between 1 and $2^n$. Once the weight $W_A$ is determined, the weight $W_B$, $W_C$ and $W_D$ corresponding to the theoretical combination ratios $R_B$, $R_C$ and $R_D$ corresponding to pixel points $N_B$, $N_C$ and $N_D$ can also be determined by the following:

$$W_B = (16-I_X) \times I_Y, W_C = (16-I_X) \times I_Y, W_D = I_X \times (16-I_Y),$$

Thus, formula (11) can be represented as:

$$P_{A'} = \frac{(P_A \times I_X \times I_Y + P_B \times (16-I_X) \times I_Y + P_C \times I_X \times (16-I_Y) + P_D \times (16-I_X) \times (16-I_Y))}{16 \times 16},$$

From formula (11), original 300×300 operations by 9 bit of multiplier are simplified using $I_X \times I_Y$ operations by 4 bit of multiplier and the operation for divided by 500×500 also replaced by a operation for shifting the result generated by multiplier right by 8 bit, reducing not only the amount but the time needed for operations.

Figures 7A, 7B:
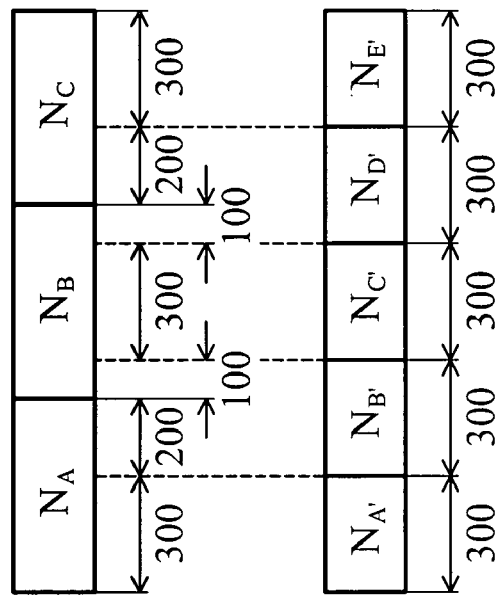
FIG. 7A shows another embodiment of a look-up table T for up-scaling an image according to the invention.
FIG. 7B shows a conventional image up-scaling method applied in a two dimensional image.

Although in the embodiment according to the invention the image is downscaled, it is to be understood that the invention can also be used for up-scaling in other embodiments. FIG. 7A shows an embodiment of a look-up table T for up-scaling an image according to the invention. FIG. 7B shows a conventional image up-scaling method for scaling original pixel points $N_A$-$N_C$ within an image in an original resolution 300 up to pixel points $N_{A'}$-$N_{E'}$ in another resolution 500. Pixel values $P_{A'}$-$P_{E'}$ of the pixel points $N_{A'}$-$N_{E'}$ can be obtained by a conventional bi-linear interpolation using the following:

$$P_{A'} = \frac{300 \times P_A}{300}, \quad (1)'$$

$$P_{B'} = \frac{200 \times P_A + 100 \times P_B}{300}, \quad (2)'$$

$$P_{C'} = \frac{300 \times P_B}{300}, \quad (3)'$$

$$P_{D'} = \frac{100 \times P_B + 200 \times P_C}{300}, \quad (4)'$$

$$P_{E'} = \frac{300 \times P_C}{300}, \quad (5)'$$

For example, if pixel value $P_{B'}$ of the original pixel point $N_{B'}$ is to be obtained and theoretical combination ratio $R_{A'}$ corresponding to the original pixel point $N_A$ is 200 which is known from formula (2)', the weight corresponding to the theoretical combination ratio $R_{A'}$ is set to 11 by checking the look-up table T (FIG. 3). Therefore, formula (2)' can be represented as:

$$P_{B'} = \frac{11 \times P_A + (16-11) \times P_B}{16}, \quad (2).''$$

Figure 7C:
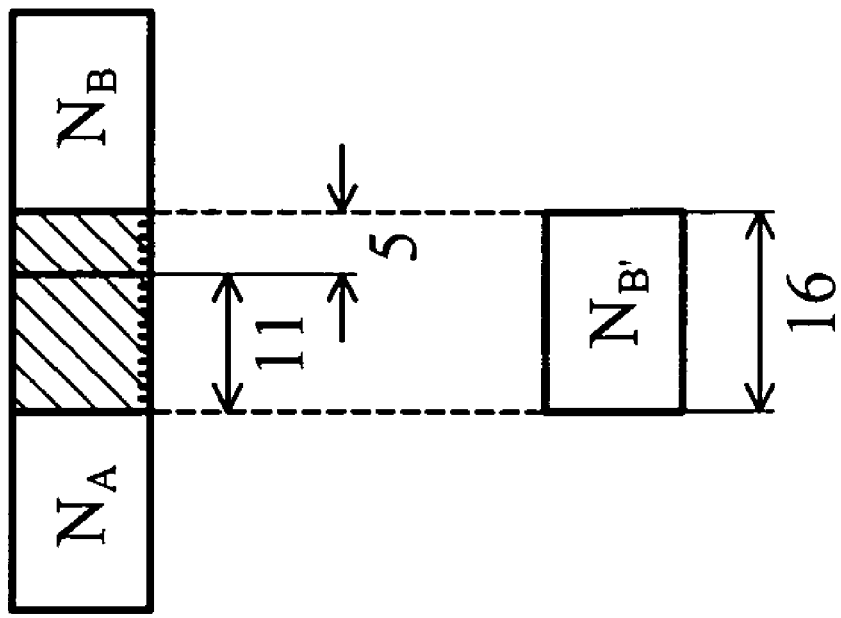
FIG. 7C shows an image up-scaling method applied in a two dimensional image according to an embodiment of the invention.
Figure 7C:
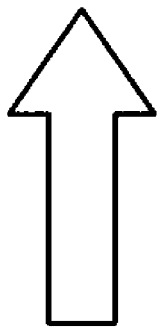
Figure 7C:
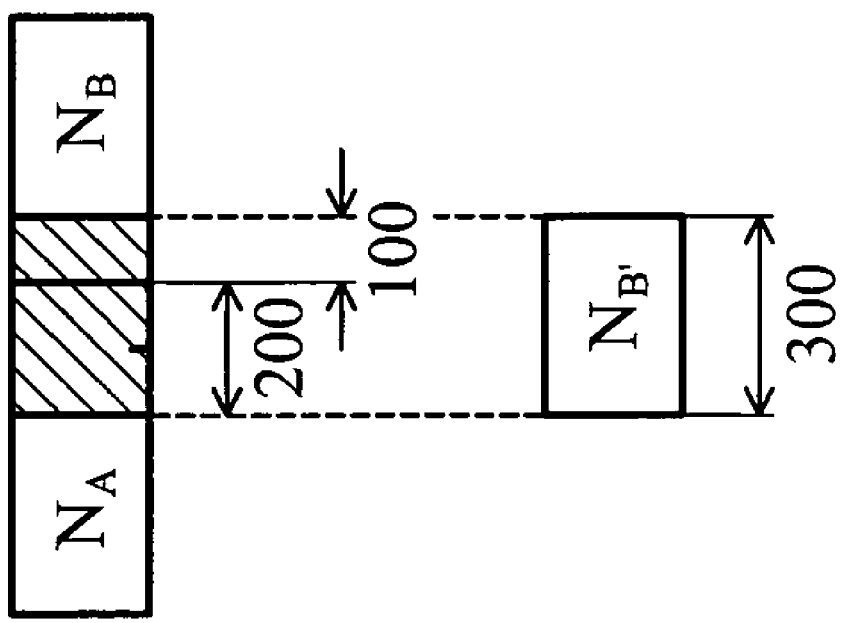

Similarly, by converting the theoretical combination ratios corresponding to the pixel values $P_{A'}$, $P_{C'}$, $P_{D'}$ and $P_{E'}$ to integers between 1 and 16 using aforementioned method and rules, pixel values $P_{A'}$, $P_{C'}$, $P_{D'}$ and $P_{E'}$ of pixel points $N_{A'}$, $N_{C'}$, $N_{D'}$ and $N_{E'}$ can also be obtained as shown in FIG. 7C. Thus, the method according to the invention reduces not only the amount but the time needed for performing related operations when it is used to scale up an image.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. An image processing method for scaling an image from an original resolution to a target resolution, wherein a pixel value $P_T$ of a target pixel point $N_T$ in the target resolution is theoretically composed of original pixel values $P_1$-$P_K$ of original pixel points $N_1$-$N_K$ in the original resolution, and K is a positive integer larger than 1, the method comprising:

a computer performing the steps of:
finding theoretical combination ratios $R_1$-$R_K$ corresponding to the original pixel points $N_1$-$N_K$;
converting the theoretical combination ratios $R_1$-$R_K$ to corresponding weights $W_1$-$W_K$, wherein each of the corresponding weights $W_1$-$W_K$ is an integer between 1 and $2^n$, n is an integer, and the sum of the corresponding weights $W_1$-$W_K$ is $2^n$; and
calculating the original pixel values $P_1$-$P_K$ with the corresponding weights $W_1$-$W_K$ using a scaler, to generate the pixel value $P_T$ of the target pixel point $N_T$ and complete the image processing, wherein converting the theoretical combination ratios $R_1$-$R_K$ to corresponding weights $W_1$-$W_K$ further comprise checking a look-up table to obtain the corresponding weights $W_1$-$W_K$, wherein the look-up table has a plurality of table fields, each having a field order, and provides a conversion rule from a value to an integer not larger than $2^n$, and n is an integer, and wherein checking the look-up table to obtain the corresponding weights $W_1$-$W_K$ further comprise:
providing a theoretical combination ratio $R_K$;
determining whether the theoretical combination ration $R_K$ being look up is less than a limit value; and
setting the corresponding weight $W_K$ to zero if the theoretical combination ratio $R_K$ being looked up is less than the limit value.

2. The method as claimed in claim 1, wherein converting the theoretical combination ratios $R_1$-$R_K$ to corresponding weights $W_1$-$W_K$ further comprises obtaining the corresponding weight $W_K$ by:

$$W_K = 2^n - \sum_{i=1}^{K-1} W_i.$$

3. The method as claimed in claim 1, wherein a corresponding weight $W_K$ is equal to the field order of a table field of the look-up table if a reference value within the table field of the look-up table exceeds or equals the theoretical combination ratio $R_k$, in which $1 \leq k \leq K$.

4. The method as claimed in claim 1, wherein the corresponding the corresponding weight $W_k$ is determined to be the field order of a first table field of the look-up table or the field order of a second table field of the look-up table using a half-adjust rounding or a rounding off method when a theoretical combination ratio $R_k$ is between a first reference value within the first table field and a second reference value within the second table field, in which $1 \leq k \leq K$.

5. The method as claimed in claim 1, wherein the look-up table comprises a plurality of reference values and the reference values are associated with the original resolution.

6. The method as claimed in claim 1, wherein calculating the original pixel values $P_1$-$P_K$ with the corresponding weights $W_1$-$W_K$ using a scaler to generate the pixel value $P_T$ of the target pixel point $N_T$ further comprises:
generating the pixel value $P_T$ of the target pixel point $N_T$ by:

$$P_T = \frac{\sum_{i=1}^{K} P_i \times W_i}{2^n}.$$

7. A system for scaling an image from an original resolution to a target resolution, wherein a pixel value $P_T$ of a target pixel point $N_T$ in the target resolution is theoretically composed of original pixel values $P_1$-$P_K$ of original pixel points $N_1$-$N_K$ in the original resolution, and K is a positive integer larger than 1, the method comprising:
- a microcontroller for generating a look-up table according to the original resolution, wherein the look-up table has a plurality of table fields, each having a field order, and provides a conversion rule from a value to an integer not larger than $2^n$, and n is an integer;
- a memory for providing the original pixel values $P_1$-$P_K$;
- a table index generator for obtaining from the look-up table corresponding weights $W_1$-$W_K$ according to theoretical combination ratios $R_1$-$R_K$ corresponding to the original pixel points $N_1$-$N_K$, wherein each of the corresponding weights $W_1$-$W_K$ is an integer between 1 and $2^n$, and sum of the corresponding weights $W_1$-$W_K$ is $2^n$; and
- a scaler for generating the pixel value $P_T$ of the target pixel point $N_T$ according to the original pixel values $P_1$-$P_K$ and the corresponding weights $W_1$-$W_K$;
wherein the microcontroller find the theoretical combination ratios $R_1$-$R_K$ and the table index generator further determines whether the theoretical combination ratio $R_K$ being look up is less than a limit value and sets the corresponding weight $W_K$ to zero if the theoretical combination ratio $R_K$ being looked up is less than the limit value.

8. The system as claimed in claim 7, wherein the scaler further comprises at least one n bit multiplier for performing the operating to generate the pixel value $P_T$ of the target pixel point $N_T$.

9. The system as claimed in claim 7, wherein the table index generator obtains the corresponding weight $W_K$ by the formula:

$$W_K = 2^n - \sum_{i=1}^{K-1} W_i.$$

10. The system as claimed in claim 7, wherein a corresponding weight $W_K$ is equal to the field order of a table field of the look-up table if a reference value within the table field of the look-up table exceeds or equals the theoretical combination ratio $R_k$, in which $1 \leq k \leq K$.

11. The method as claimed in claim 7, wherein the corresponding the corresponding weight $W_k$ is determined to be the field order of a first table field of the look-up table or the field order of a second table field of the look-up table using a half-adjust rounding or a rounding off method when a theoretical combination ratio $R_k$ is between a first reference value within the first table field and a second reference value within the second table field, in which $1 \leq k \leq K$.

12. The system as claimed in claim 7, wherein the look-up table comprises a plurality of reference values and the reference values are associated with the original resolution.

13. The system as claimed in claim 7, wherein the scaler generates the pixel value $P_T$ of the target pixel point $N_T$ using the formula:

$$P_T = \frac{\sum_{i=1}^{K} P_i \times W_i}{2^n}.$$

14. The system as claimed in claim 7, wherein the microcontroller further generates a second look-up table if the original pixel points $N_1$-$N_K$ are two-dimensional pixel points.

* * * * *